United States Patent
Pan et al.

(10) Patent No.: US 10,111,180 B2
(45) Date of Patent: Oct. 23, 2018

(54) POWER CONTROL METHOD AND DEVICE

(75) Inventors: Xueming Pan, Beijing (CN); Zukang Shen, Beijing (CN); Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 414 days.

(21) Appl. No.: 14/002,112

(22) PCT Filed: Nov. 9, 2011

(86) PCT No.: PCT/CN2011/081994
§ 371 (c)(1),
(2), (4) Date: Aug. 28, 2013

(87) PCT Pub. No.: WO2012/062208
PCT Pub. Date: May 18, 2012

(65) Prior Publication Data
US 2014/0022994 A1 Jan. 23, 2014

(30) Foreign Application Priority Data
Nov. 9, 2010 (CN) .......................... 2010 1 0539342

(51) Int. Cl.
*H04W 52/18* (2009.01)
*H04W 52/14* (2009.01)
(Continued)

(52) U.S. Cl.
CPC ......... *H04W 52/18* (2013.01); *H04W 52/146* (2013.01); *H04W 52/247* (2013.01); *H04W 52/325* (2013.01); *H04W 52/42* (2013.01)

(58) Field of Classification Search
CPC . H04W 52/146; H04W 52/18; H04W 52/247; H04W 52/325; H04W 52/42
(Continued)

(56) References Cited

U.S. PATENT DOCUMENTS 8,155,689 B2   4/2012 Butala
2011/0080876 A1*  4/2011 Yin ................... H03M 13/6525
                                                370/329
(Continued)

FOREIGN PATENT DOCUMENTS

CN     1682466 A    10/2005
CN   101617482 A    12/2009
CN   102083181 A     6/2011

OTHER PUBLICATIONS

3GPP TS 36.213 v9.3.0 (Sep. 2010), 3rd Generation Partnership Project; Technical Specification Group Access Network; Evolved Universal Terrestrial Radio Access (E-UTRA); Physical layer procedures (Release 9), pp. 1-80.*

(Continued)

*Primary Examiner* — Melvin Marcelo
(74) *Attorney, Agent, or Firm* — Oliff PLC

(57) ABSTRACT

A power control method and device are disclosed. The method comprises: a user equipment receiving a power adjustment value corresponding to transmit diversity determined and sent by a network side device; the user equipment determines a transmission power for a PUCCH transmission according to the power adjustment value. In the embodiment of the present invention, the transmission power adopted by the transmission PUCCH channel is determined according to the power adjustment value corresponding to the transmission diversity, solving the problem of inaccurate power control after introducing the PUCCH transmission diversity, so that each PUCCH format is capable of performing transmission diversity power control independently.

8 Claims, 2 Drawing Sheets

(51) Int. Cl.
*H04W 52/24* (2009.01)
*H04W 52/32* (2009.01)
*H04W 52/42* (2009.01)

(58) Field of Classification Search
USPC .......................................................... 370/329
See application file for complete search history.

(56) References Cited

U.S. PATENT DOCUMENTS

2011/0096815 A1\* 4/2011 Shin et al. .................... 375/219
2011/0228731 A1\* 9/2011 Luo et al. ..................... 370/329
2014/0022994 A1 1/2014 Pan et al.

OTHER PUBLICATIONS

International Search Report of PCT/CN2011/081994, dated Feb. 23, 2012.

\* cited by examiner

POWER CONTROL METHOD AND DEVICE

CROSS REFERENCE TO RELATED APPLICATIONS

This application is the National Stage of PCT/CN2011/081994 filed on 9th Nov., 2011, which claims priority under 35 U.S.C. 119 of Chinese Application CN 201010539342.2 filed on 9th Nov., 2010, the disclosure of which is incorporated by reference. The international application under PCT article 21(2) was not published in English.

FIELD OF THE PRESENT INVENTION

The present invention relates to the field of communication technology, in particular to power control method and device.

BACKGROUND OF THE PRESENT INVENTION

LTE (Long Term Evolution) refers to evolution of 3G (3rd Generation). It improves and enhances air access technology of 3G and adopts OFDM (Orthogonal Frequency Division Multiplexing) and MIMO (Multiple Input Multiple Output) as the standard for evolution of the LTE wireless network. Therein, power control method of PUCCH (Physical Uplink Control Channel) is specified in the LTE system, which is to calculate PUCCH transmission power by UE (user equipment) side according to configuration and scheduling condition of a base station.

Uplink multi-antenna transmission mode is introduced in LTE-A (LTE-Advanced) system, and transmit diversity technology could be adopted for the PUCCH to improve performance; SORTD mode could be adopted as the specific transmit diversity mechanism, viz. a base station distributes independent PUCCH channel resource to each uplink antenna port of the UE. The UE could send PUCCH by using multiple antenna ports simultaneously and making use of different PUCCH resources respectively.

In the procedure of realizing the objects of the present invention, at least the following problems existing in the current technologies were found:

SORTD is supported by all kinds of PUCCH formats, but it is configured independently for each format to open SORTD or not, viz. it is possible for the UE to send PUCCH format 1a by SORTD while send PUCCH format 2 by single antenna port mode; since the detection performances acquired at a base station side for PUCCH transmission modes of single antenna port and transmit diversity could be distinguished, difference between transmission power of UE and expected power of base station will be caused during application of the current PUCCH power control mode. For example, if SORTD improves detection performance of PUCCH for 3 dB, and the UE still sets power for corresponding PUCCH channel of each antenna port according to the current power control formula and relevant parameter configuration, total output power of the UE will exceed the actual needed transmission power of 3 dB, so that power of the UE is consumed, interference between users and cells is increased, and system performance is wasted.

SUMMARY OF THE PRESENT INVENTION

The embodiments of the present invention put forward power control method and device, so as to reduce power consumption of UE and improve system performance.

For achieving the above purpose, the embodiments of the present invention put forward a power control method, which comprises:

A UE receives a power adjustment value corresponding to transmit diversity determined and sent by a network side device;

The UE determines the transmission power for a PUCCH transmission according to the power adjustment value.

The embodiments of the present invention put forward a UE, which comprises:

Receiving module, used to receive a power adjustment value corresponding to transmit diversity determined and sent by a network side device;

Determination module, used to determine a transmission power of a transmission PUCCH channel according to the power adjustment value.

The embodiments of the present invention put forward a power control method, which comprises:

A network side device determines the power adjustment value corresponding to transmit diversity of UE, the set of values for the power adjustment value is predetermined;

The network side device sends the power adjustment value corresponding to transmit diversity to the UE by higher layer signaling.

The embodiments of the present invention put forward a network side device, which comprises:

Determination module, used to determine the power adjustment value corresponding to transmit diversity of UE; the set of values for the power adjustment value is predetermined;

Sending module, used to send the power adjustment value corresponding to transmit diversity to the UE by higher layer signaling.

Compared with the present technology, the embodiments of the present invention at least possess the following advantages:

Determining the transmission power for a PUCCH transmission by using the power adjustment value corresponding to the transmit diversity, solving the problem of inaccurate power control after introducing the PUCCH transmit diversity, enabling each PUCCH format to perform power control of transmit diversity independently.

BRIEF DESCRIPTION OF THE DRAWINGS

To describe the embodiments or the technical programs in prior art of the present invention clearly, brief description of the drawing required to be used in embodiments or prior art description of the present invention is made. It is clear that the drawings in descriptions below are only some embodiments of the present invention. Technical personnel of the field can acquire other drawings according to these drawings in the absence of creative work.

DETAILED DESCRIPTION OF THE EMBODIMENTS OF THE PRESENT INVENTION

Figure 1:
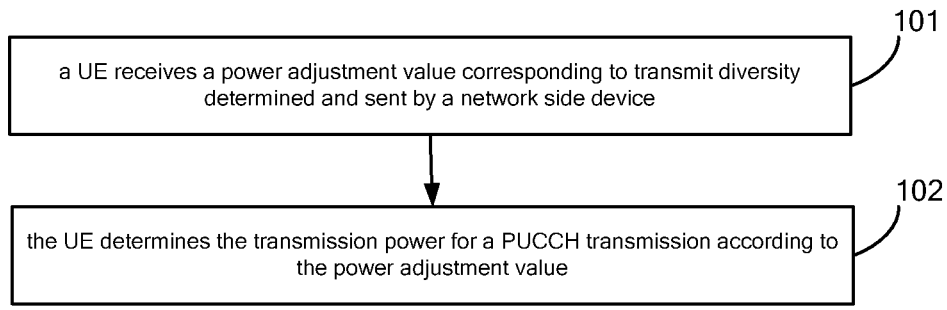
FIG. 1 is a flow diagram of the power control method provided in Embodiment I of the present invention.

In the following parts, clear and complete descriptions of the technology programs in embodiments of the present invention are made combined with drawings of the embodiments. It is clear that the embodiments described here are only parts of the embodiments of the present invention. According to the embodiments of the present invention, any other embodiments made by common technical personnel of the field in the absence of creative work all belong to the scope of the patent protection of the invention.

In LTE system, a UE side could calculate transmission power of PUCCH according to base station configuration and scheduling condition. Therein, in the uplink subframe i, it includes but is not limited to the following formula for the UE to calculate the transmission power $P_{PUCCH}$ for a PUCCH transmission:

$$P_{PUCCH}(i)=\min\{P_{CMAX}, P_{0\_PUCCH}+PL+ h(n_{CQI},n_{HARQ})+\Delta_{F\_PUCCH}(F)+g(i)\} \ [dBm] \quad \text{Formula (1)}$$

In Formula (1), $P_{CMAX}$ represents the maximum UE transmission power of higher layer configuration, and the $P_{CMAX}$ could be selected according to actual demands.

Parameter $\Delta_{F\_PUCCH}(F)$ represents the parameter from higher layer configuration, and could be selected according to actual demands. The parameter $\Delta_{F\_PUCCH}(F)$ represents power offset corresponding to PUCCH format 1a with regard to different PUCCH formats, wherein, the PUCCH format includes but is not limited to various formats like PUCCH format 1/1a/1b/2/2a/2b, etc.;

h(n) represents power offset relevant to the number of bits carried by PUCCH, wherein, $n_{CQI}$ corresponds to the carried number of CQI (Channel Quality Indicator) bits, and $n_{HARQ}$ corresponds to the carried number of ACK (Acknowledge Character)/NACK (Negative Acknowledgment) bits;

$P_{O\_PUCCH}$ represents target value of transmission power, consisting of combination of cell-specific part $P_{O\_NOMINAL\_PUCCH}$ and UE-specific part $P_{O\_UE\_PUCCH}$.

PL represents path loss value measured by UE;

g (i) represents the cumulative power control commands.

Uplink Control Channel (PUCCH) is introduced in LTE-A system; after SORTD mode is adopted, all the following PUCCH formats will support SORTD mode, including but not limited to PUCCH format 1/1a/1b/2/2a/2b/3, etc. while it is configured independently for each format to open SORTD or not, viz. it is possible for the UE to send PUCCH format 1a by SORTD mode while send PUCCH format 2 by single antenna port mode; and the detection performances acquired at a base station side for PUCCH transmission modes of single antenna port and transmit diversity could be distinguished, Therefore, in LTE-A system, the UE calculates transmission power of PUCCH according to base station configuration, measurement information and scheduling information; it includes but is not limited to the following formula for the UE to calculate the transmission power $P_{PUCCH}$ for a PUCCH transmission:

$$P_{PUCCH}(i)=\min\{P_{CMAX}, P_{0\_PUCCH}+PL+ h(n_{CQI},n_{HARQ})+\Delta_{F\_PUCCH}(F)+\Gamma(F')+g(i)\} \quad \text{Formula (2)}$$

In Formula (2), $P_{CMAX}$ represents the maximum UE transmission power of higher layer configuration; parameter $\Delta_{F\_PUCCH}(F)$ represents the parameter from higher layer configuration; h(n) represents power offset relevant to the number of bits carried by PUCCH, wherein, $n_{CQI}$ corresponds to the carried number of CQI bits, and $n_{HARQ}$ corresponds to the carried number of ACK/NACK bits; $P_{O\_PUCCH}$ represents target value of transmission power; PL represents path loss value measured by UE; g(i) represents the cumulative power control commands; $\Gamma_{TxD}(F')$ represents power adjustment value relevant to transmit diversity.

In conclusion, Formula (2) improves the PUCCH power control formula of Formula (1), and introduces transmit diversity-related power adjustment value, which is marked as $\Gamma_{TxD}(F')$. Wherein, F' represents PUCCH format, and a configurable $\Gamma_{TxD}(F')$ parameter set of values could be defined respectively for each PUCCH format F', for example, the set of values for parameter $\Gamma_{TxD}(F')$ is defined as 4 possibilities, and is specified by protocol, such as {0, −1, −2, −3} dB; quantized by 2 bits higher layer signaling, and sent to a UE by RRC (Radio Resource Control). It is possible that in actual application, the set of values is of other values like the one including 2 values or 8 values, which will not be explained in the embodiments of the present invention again.

In conclusion, 4 different RRC signaling configurations $\Gamma_{TxD}(F')$ exist corresponding to the following 4 different PUCCH formats, as is shown in Table 1, it is a $\Gamma_{TxD}(F')$ set of values corresponding to different PUCCH formats, wherein, the $\Gamma_{TxD}(F')$ set of values corresponding to different F' could be the same or different.

TABLE 1

| F' | PUCCH format | $\Gamma_{TxD}(F')_{value\ assemble\ (dB)}$ |
|---|---|---|
| F' = 1 | PUCCH format 1 | {a1, b1, c1, d1} |
| F' = 2 | PUCCH format 1a/1b and channel selection | {a2, b2, c2, d2} |
| F' = 3 | PUCCH format 2/2a/2b | {a3, b3, c3, d3} |
| F' = 4 | PUCCH format 3 | {a4, b4, c4, d4} |

Based on the above conditions, Embodiment I of the present invention provides a power control method, comprising the following steps as shown in FIG. 1:

Step 101, a UE receives a power adjustment value corresponding to transmit diversity determined and sent by a network side device. The network side device could perform selection according to actual demands, including but not limited to base station.

Therein, SORTD is supported by all PUCCH formats, it is independently configured for each format to open SORTD or not; therefore, with regard to power adjustment value corresponding to transmit diversity of each PUCCH format of transmit diversity, the UE shall receive the power adjustment value corresponding to each PUCCH format of transmit diversity determined and sent by a network side device; the set of values for the power adjustment is predetermined. As is shown in Table 1, for PUCCH format 1, the power adjustment value (namely the set of values for the power adjustment value, which is predetermined) is {a1, b1, c1, d1}, of which the values could be adjusted according to actual demands; for PUCCH format 3, the power adjustment value (namely the set of values for the power adjustment value, which is predetermined) is {a4, b4, c4, d4}, etc.

Further, power adjustment value (the set of values for the power adjustment value) corresponding to transmit diversity of a UE could be determined by a network side device (such as a base station). Therefore, the power adjustment value corresponding to transmit diversity of each PUCCH format shall be determined by a base station and sent to the UE by the base station through higher layer signaling (such as RRC signaling), viz. the power adjustment value corresponding to transmit diversity of each PUCCH format 1 is contained in higher layer signaling. For example, as is shown in Table 1, when the base station determines power adjustment value of PUCCH format 1 as {a1, b1, c1, d1}, the set of values for the power adjustment value {a1, b1, c1, d1} could be sent to the UE by RRC signaling.

Step 102, the UE determines the transmission power for a PUCCH transmission according to the power adjustment value. Therein, the UE could determine the transmission power for a PUCCH transmission according to the power adjustment value, network side configuration, measurement information and scheduling information. Further, the UE could determine transmission power for a PUCCH transmission according to Formula (2), of which the determining process has already been explained above and will not be described in detail here again.

In conclusion, in the embodiments of the present invention, the transmission power for a PUCCH transmission is determined according to a power adjustment value corresponding to transmit diversity, the problem of inaccurate power control after introducing PUCCH transmit diversity is solved, and each PUCCH format is enabled to perform power control of transmit diversity independently.

Figure 2:
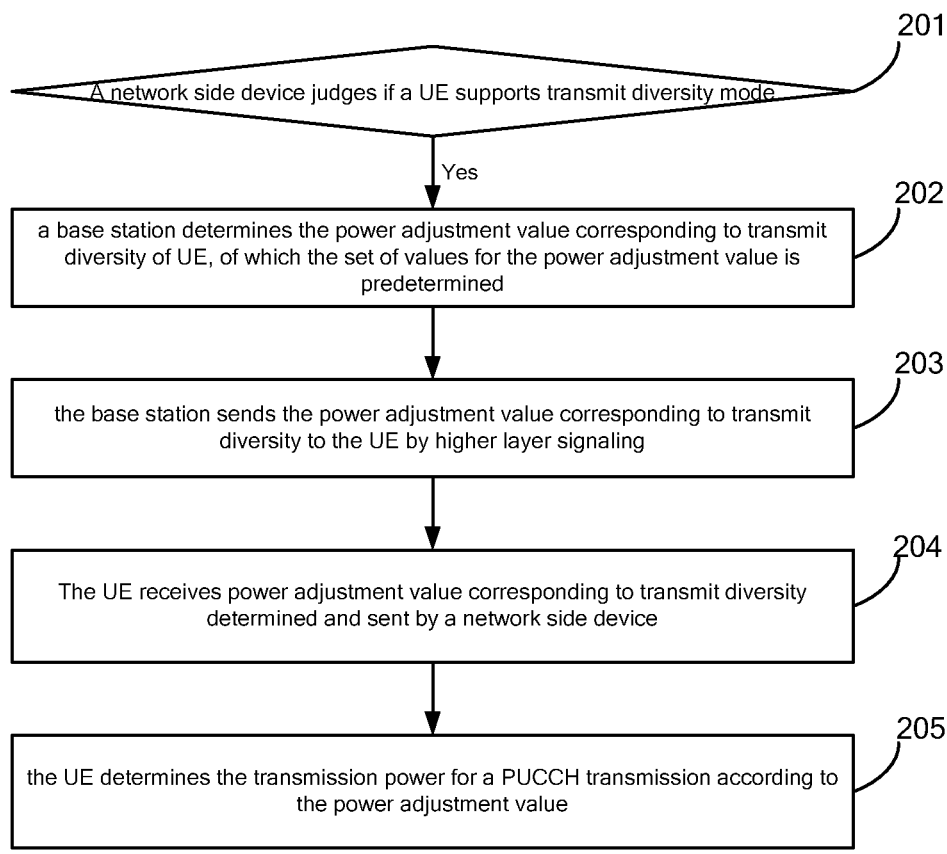
FIG. 2 is a flow diagram of the power control method provided in Embodiment II of the present invention.

Embodiment II of the present invention provides a power control method as shown in FIG. 2, which comprises the following steps:

Step 201, a network side device judges if transmit diversity mode is supported by the UE, if yes, turn to Step 202; otherwise, end the flow. Therein, the network side device includes but is not limited to a base station.

Step 202, a base station determines the power adjustment value corresponding to transmit diversity of UE, of which the set of values for the power adjustment value is predetermined.

Wherein, SORTD is supported by all formats of PUCCH it is independently configured for each format to open SORTD or not. Therefore, with regard to power adjustment value corresponding to transmit diversity of each PUCCH format of the UE, the base station shall at first determine the possible PUCCH format to be sent by UE, then determine the power adjustment value corresponding to the transmit diversity of the PUCCH format (of which the set of values is predetermined). For example, when the UE supports transmit diversity of PUCCH format 1, the base station in this step shall determine the power adjustment value of PUCCH format 1. As is shown in Table 1, the base station could preset the set of values for the power adjustment value as {a1, b1, c1, d1}.

Step 203, the base station sends the power adjustment value corresponding to transmit diversity to the UE by higher layer signaling. For example, a base station sends a power adjustment value corresponding to transmit diversity of PUCCH format (namely the possible PUCCH format to be sent by UE) to a UE by RRC signaling.

Step 204, the UE receives power adjustment value corresponding to transmit diversity determined and sent by a network side device, viz. The UE determines the power adjustment value corresponding to the transmit diversity according to the received RRC signaling.

Step 205, the UE determines the transmission power for a PUCCH transmission according to the power adjustment value.

In conclusion, in the embodiments of the present invention, the transmission power for a PUCCH transmission is determined according to the power adjustment value corresponding to the transmit diversity, the problem of inaccurate power control after introducing the PUCCH transmit diversity is solved, and each PUCCH format is enabled to perform power control of transmit diversity independently.

Figure 3:
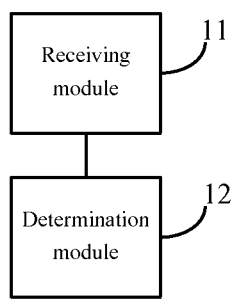
FIG. 3 is a structural diagram of a UE provided in embodiments of the present invention.

Based on the same inventive concept of the aforementioned method, the embodiments of the present invention provide a UE as shown in FIG. 3, which comprises:

Receiving module 11, used to receive the power adjustment value corresponding to transmit diversity determined and sent by a network side device;

Determination module 12, used to determine the transmission power for a PUCCH transmission according to the power adjustment value;

The receiving module 11, used specifically to receive the power adjustment value corresponding to transmit diversity determined and sent by a network side device of each PUCCH format. The set of values for the power adjustment value is predetermined.

The receiving module 11, further used to receive higher layer RRC signaling from a network side device; the higher layer RRC signaling contains power adjustment value corresponding to transmit diversity of each PUCCH format.

The determination module 12, used specifically to determine the transmission power for a PUCCH transmission according to the power adjustment value, network side configuration, measurement information and scheduling information.

The determination module 12, further used to determine the transmission power for a PUCCH transmission in uplink subframe i according to the formula $$P_{PUCCH}(i)=\min\{P_{CMAX},P_{0\_PUCCH}+PL+\\h(n_{CQI},n_{HARQ})+\Delta_{F\_PUCCH}(F)+\Gamma_{TxD}(F')+g(i)\}$$

Wherein, $P_{CMAX}$ represents the maximum UE transmission power of higher layer configuration;

Parameter $\Delta_{F\_PUCCH}(F)$ represents the parameter from higher layer configuration;

h(n) represents power offset relevant to the number of bits carried by PUCCH, wherein, $n_{CQI}$ corresponds to the carried number of CQI bits, and $n_{HARQ}$ corresponds to the carried number of ACK/NACK bits;

$P_{O\_PUCCH}$ represents the target value of transmission power;

g(i) represents the cumulative power control commands;

PL represents path loss value measured by UE;

$\Gamma_{TxD}(F')$ represents the adjustment value relevant to transmit diversity corresponding to transmit diversity.

Herein, modules of the inventive device can be integrated or deployed separately. Said modules can be either combined into one module or further decomposed into several sub-modules.

Figure 4:
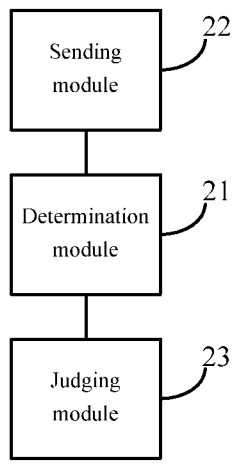
FIG. 4 is a structural diagram of a network side device provided in embodiments of the present invention.

Based on the same inventive concept of the aforementioned method, the embodiments of the present invention also provide a network side device as shown in FIG. 4, which comprises:

Determination module 21, used to determine the power adjustment value corresponding to transmit diversity of a UE, the set of values for the power adjustment value is predetermined;

Sending module 22, used to send the power adjustment value corresponding to the transmit diversity to the UE by higher layer signaling.

The determination module 21, used specifically to determining the possible

PUCCH format to be sent by the UE and the power adjustment value corresponding to the transmit diversity of the PUCCH format.

The sending module 22, used specifically to sending power adjustment value corresponding to the transmit diversity of PUCCH format to the UE by higher layer RRC signaling.

The network side device also comprises:

Judging module 23, used to judge if the UE supports transmit diversity mode.

Herein, modules of the inventive device can be integrated or deployed separately. Said modules can be either combined into one module or further decomposed into several sub-modules.

Through the description of the embodiments above, the technical personnel in this field can understand clearly that the present invention can be implemented by software and necessary general hardware platform or hardware (the former is better in most cases). Based on this understanding, the technical program or the part making contributions to the prior art of the present invention can be embodied by a form of software products essentially which can be stored in a storage medium, including a number of instructions for making a computer device (such as personal computers, servers, or network equipments, etc.) implement the methods described in the embodiments of the present invention.

The technical personnel in this field can be understood that the illustration is only schematic drawings of a preferred embodiment, and the module or process is not necessary for the implementation of the present invention.

The technical personnel in this field can be understood that the modules can be distributed in device of the embodiments according to the description of the embodiments above, and also can be varied in one or multiply device of the embodiments. The modules of the embodiments can be combined into a module, and also can be further split into several sub-modules.

The number of the embodiments is only to describe, it does not represent the pros and cons of the embodiments.

The descriptions above are just preferred implement ways of the present invention. It should be pointed that, for general technical personnel in this field, some improvement and decorating can be done, which should be as the protection scope of the present invention.

The invention claimed is:

1. A power control method, comprising:
receiving, by a UE, a power adjustment value corresponding to transmit diversity for each PUCCH format which is configured with transmit diversity mode, the power adjustment value having been determined and sent by a network side device, a set of values for the power adjustment value being predetermined;
determining, by the UE, a transmission power for the PUCCH transmission in uplink subframe i according to the formula:

$$P_{PUCCH}(i)=\min\{P_{CMAX}, P_{0\_PUCCH}+PL+ h(n_{CQI},n_{HARQ})+\Delta_{F\_PUCCH}(F)+\Gamma_{TxD}(F')+g(i)\};$$

and
performing a PUCCH transmission with the determined transmission power,
wherein $P_{CMAX}$ represents maximum UE transmission power configured by higher layers,
parameter $\Delta_{F\_PUCCH}(F)$ represents a parameter from higher layer configuration,
h(n) represents power offset relevant to a number of bits carried by PUCCH,
$n_{CQI}$ corresponds to a number of carried CQI bits,
$n_{HARQ}$ corresponds to a number of carried ACK/NACK bits,
$P_{O\_PUCCH}$ represents a target value of transmission power,
g(i) represents cumulative power control commands,
PL represents path loss value measured by the UE, and
$\Gamma_{TxD}(F')$ represents the power adjustment value corresponding to transmit diversity for PUCCH format F'.

2. The method of claim 1, the set of values for the power adjustment value comprising:
when a specific transmission channel format is PUCCH format 1, the set of values for the power adjustment value shall include at least two values;
when the specific transmission channel format is PUCCH format 1a/1b and channel selection, the set of values for the power adjustment value shall include at least two values;
when the specific transmission channel format is PUCCH format 2/2a/2b, the set of values for the power adjustment value shall include at least two values; and
when the specific transmission channel format is PUCCH format 3, the set of values for the power adjustment value shall include at least two values.

3. The method of claim 2, wherein the set of values for the power adjustment value corresponding to each channel format is the same.

4. The method of claim 1, further comprising:
receiving, by the UE, higher layer RRC signaling from the network side device;
wherein the higher layer RRC signaling contains power adjustment values corresponding to the transmit diversity of each PUCCH format.

5. A UE, comprising:
a computer configured to:
receive a power adjustment value corresponding to transmit diversity for each PUCCH format which is configured with transmit diversity mode, the power adjustment value having been determined and sent by a network side device, a set of values for the power adjustment value being predetermined;
determine a transmission power for a PUCCH transmission in uplink subframe i according to the formula:

$$P_{PUCCH}(i)=\min\{P_{CMAX}, P_{0\_PUCCH}+PL+ h(n_{CQI},n_{HARQ})+\Delta_{F\_PUCCH}(F)+\Gamma_{TxD}(F')+g(i)\};$$

and
perform a PUCCH transmission with the determined transmission power,
wherein $P_{CMAX}$ represents maximum UE transmission power configured by higher layers,
parameter $\Delta_{F\_PUCCH}(F)$ represents a parameter from higher layer configuration,
h(n) represents power offset relevant to a number of bits carried by PUCCH,
$n_{CQI}$ corresponds to a number of carried CQI bits,
$n_{HARQ}$ corresponds a number of carried ACK/NACK bits,
$P_{O\_PUCCH}$ represents the target value of transmission power,
g(i) representing the cumulative power control commands,
PL representing path loss value measured by UE, and
$\Gamma_{TxD}(F')$ represents the power adjustment value corresponding to transmit diversity for PUCCH format F'.

6. The UE of claim 5, wherein the computer is further configured to receive higher layer RRC signaling from the network side device, the higher layer RRC signaling containing the power adjustment value corresponding to transmit diversity of each PUCCH format.

7. The UE of claim 5, the set of values for the power adjustment value comprising:
when a specific transmission channel format is PUCCH format 1, the set of values for the power adjustment value shall include at least two values;

when the specific transmission channel format is PUCCH format 1a/1b and channel selection, the set of values for the power adjustment value shall include at least two values;

when the specific transmission channel format is PUCCH format 2/2a/2b, the set of values for the power adjustment value shall include at least two values; and when the specific transmission channel format is PUCCH format 3, the set of values for the power adjustment value shall include at least two values.

8. The UE of claim 5, wherein the set of values for the power adjustment value corresponding to each channel format is the same.

* * * * *